(12) United States Patent
Yang et al.

(10) Patent No.: US 8,471,147 B2
(45) Date of Patent: Jun. 25, 2013

(54) COVER FOR ELECTRONIC DEVICE

(75) Inventors: He-Hui Yang, Shenzhen (CN); Yu-Guo Gao, Shenzhen (CN); Kai-Kuei Wu, Tu-Cheng (TW); Kun-Chih Hsieh, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 132 days.

(21) Appl. No.: 13/158,446

(22) Filed: Jun. 12, 2011

(65) Prior Publication Data

US 2012/0145576 A1 Jun. 14, 2012

(30) Foreign Application Priority Data

Dec. 11, 2010 (CN) .......................... 2010 1 0583513

(51) Int. Cl.
*H02G 3/14* (2006.01)

(52) U.S. Cl.
USPC ................ 174/66; 174/67; 206/320; 220/241

(58) Field of Classification Search
USPC .......... 174/66, 67, 50; 220/241, 242; 206/320
See application file for complete search history.

(56) References Cited

U.S. PATENT DOCUMENTS

| 7,923,634 | B2 * | 4/2011 | Yokawa | 174/50 |
| 8,067,690 | B2 * | 11/2011 | Anders et al. | 174/50 |
| 2011/0272308 | A1 * | 11/2011 | Andre | 206/320 |

FOREIGN PATENT DOCUMENTS

| CN | 201388352 Y | 1/2010 |
| TW | M241805 U | 8/2004 |
| TW | 201022897 A | 6/2010 |

* cited by examiner

*Primary Examiner* — Dhirubhai R Patel
(74) *Attorney, Agent, or Firm* — Altis Law Group, Inc.

(57) ABSTRACT

A cover includes an upper cover, a lower cover, a fixing member fixed to the lower cover, and a sliding member positioned between the lower cover and the fixing member. The lower cover defines a notch. The sliding member includes at least one latching portion and a toggle that is slidably received in the notch. The upper cover defines at least one opening. The at least one latching portion is slidably received in the at least one opening correspondingly to connect the upper cover to the lower cover.

4 Claims, 7 Drawing Sheets

COVER FOR ELECTRONIC DEVICE

BACKGROUND

1. Technical Field

The present disclosure relates to covers, especially to a cover of an electronic device.

2. Description of Related Art

A bottom cover of electronic devices such as electronic books, usually includes an upper cover portion and a lower cover portion connected to the upper cover portion. An opening is defined between the upper cover portion and the lower cover portion. A user's thumb can fit into the opening to push and detach the upper cover portion. However, the opening is unsightly.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
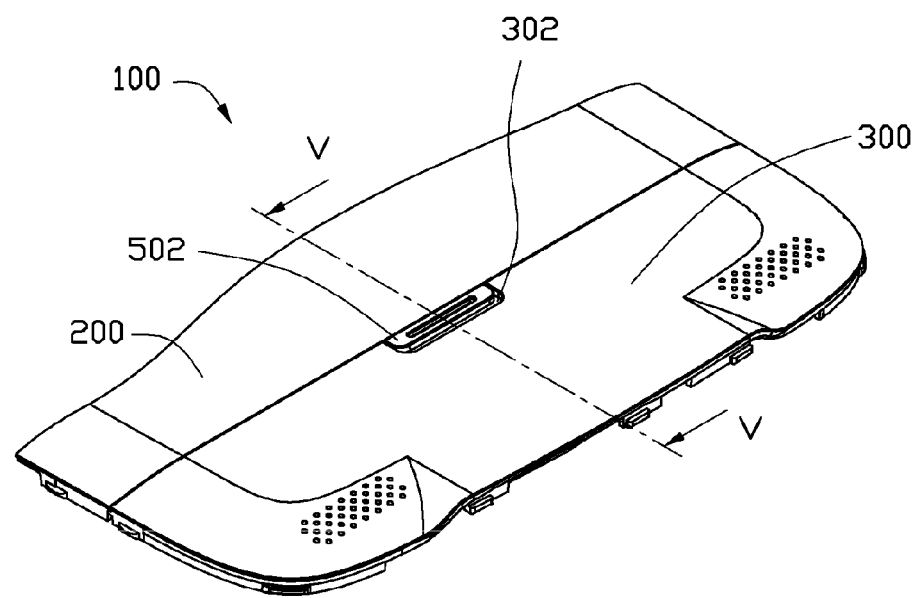
FIG. 1 is a partial, isometric view of a cover according to an exemplary embodiment.
Figure 2:
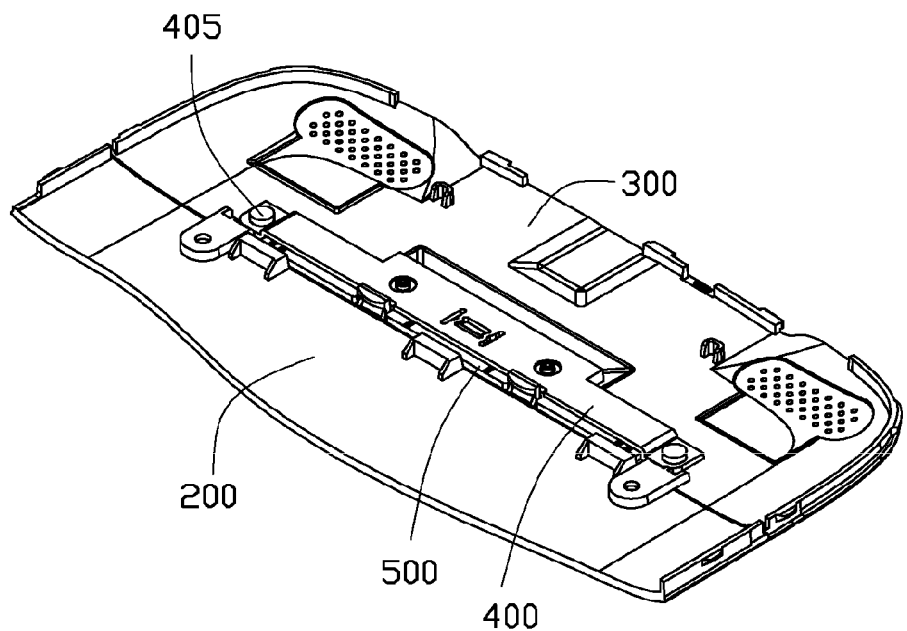
FIG. 2 is similar to FIG. 1, but viewed from a different viewpoint.

Referring to FIGS. 1 and 2, a cover 100 of an electronic device according to an exemplary embodiment includes an upper cover 200 clasped to a body (not shown) of the electric device, a lower cover 300 fixed to the body, a fixing member 400, and a sliding member 500. The fixing member 400 is fixed to the lower cover 300. The sliding member 500 is positioned between the lower cover 300 and the fixing member 400. An edge of the lower cover 300 defines a notch 302. The sliding member 500 is formed with a toggle 502 that is slidably received in the notch 302.

Figure 3:
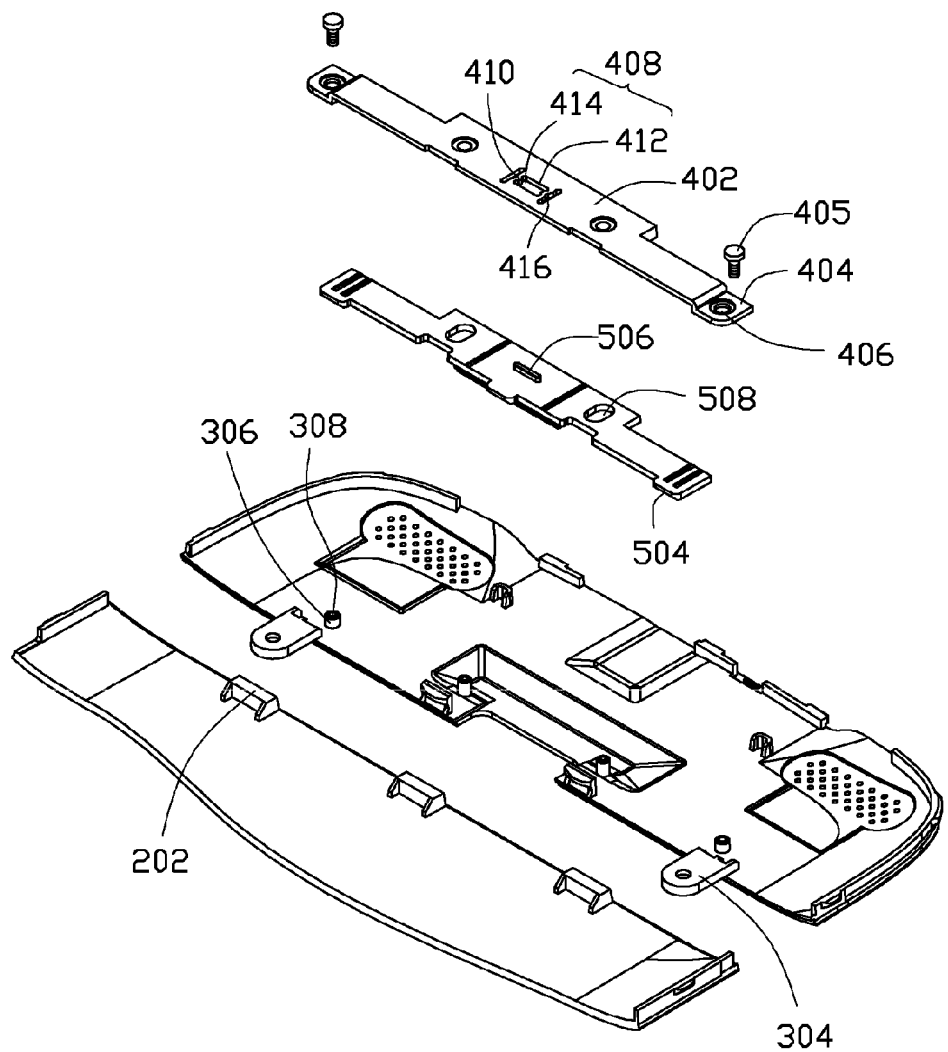
FIG. 3 is an isometric, exploded view of the cover of FIG. 2.
Figure 7:
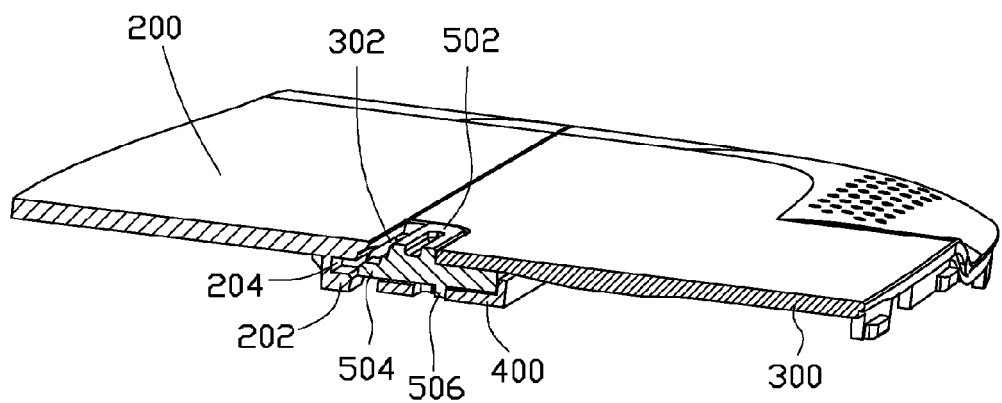
FIG. 7 is a cross-sectional view similar to FIG. 5, with the sliding member separated from the upper cover.

Referring to FIG. 3, the upper cover 200 includes a number of blocks 202 protruding therefrom. Referring to FIG. 7, each block 202 defines an opening 204 facing the lower cover 300.

The lower cover 300 is formed with a number of protruding tabs 304 and a number of protruding posts 306. The protruding tabs 304 extend from the edge of the upper cover 200 where the notch 302 is formed and reside at the inner side of the lower cover 200. Each protruding tab 304 defines a threaded hole (not labeled) allowing for the engagement of a screw, to fix the lower cover to a body of the electronic device. The protruding posts 306 protrude from the inner surface of the lower cover 300. Each protruding post 306 defines a threaded hole 308.

Figure 4:
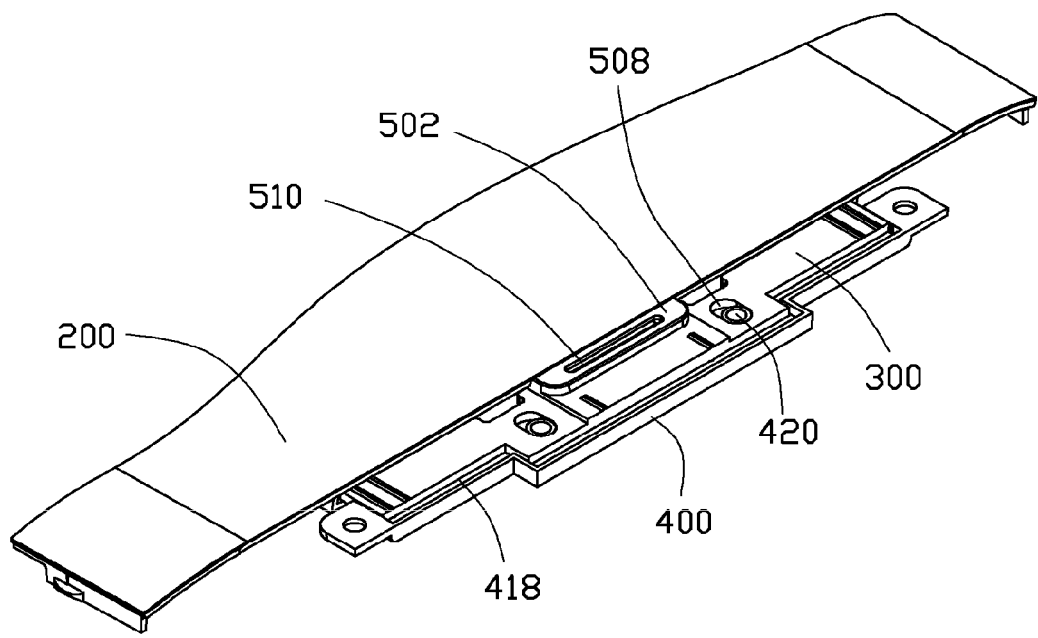
FIG. 4 is similar to FIG. 1, but with a lower cover omitted for clarity.

The sliding member 500 is an elongated plate. The sliding member 500 includes a number of latching portions 504 protruding from an edge thereof. The latching portions 504 are respectively slidably received in the corresponding openings 204 of the upper cover 200. The sliding member 500 further includes a restricting member 506 opposite to the fixing member 400. Two through holes 508 are respectively defined at opposite sides of the restricting member 506. Referring to FIG. 4, the toggle 502 defines a slot 510. A user can push the toggle 502 to slide the sliding member 500.

The fixing member 400 can be made of elastic plastic and is an elongated plate. The fixing member 400 includes a base 402 and a pair of fixing portions 404 at two opposite ends of the base 402.

The fixing portions 404 each define a fixing hole 406, which allow the screws to extend through when screwed into the corresponding threaded holes 308, thereby fixing the fixing member 400 to the lower cover 300.

The base 402 defines a substantially rectangular restricting groove 408. A pair of smooth protrusions 410 protrudes from opposite sidewalls of the restricting groove 408. The protrusions 410 divide the restricting groove 408 into two hollow portions 412 at opposite sides of the protrusions 410 and a hollow space 414 between the two protrusions 410. The hollow portions 412 can receive the restricting member 506 therein. The protrusions 410 are configured for preventing the restricting member 506 from freely moving between the hollow portions 412. The protrusions 410 can be urged to elastically deform, allowing the restricting member 506 to move between the hollow portions 412.

In the embodiment, the base 402 further defines a pair of slots 416 adjacent to the restricting groove 408. The slots 416 are symmetrically positioned at opposite sides of the restricting groove 408. An extending direction of the slots 416 is parallel to a movement direction of the restricting member 506. The slots 416 enable the protrusions 410 and the sidewall, where the protrusions 410 are located, as a whole to elastically deform.

Referring to FIG. 4, the base 402 further defines a receiving space 418 opposite to the lower cover 300 to receive the sliding member 500. The base 402 further includes a pair of guiding posts 420 protruding from the bottom of the receiving space 418. The guiding posts 420 are respectively received in the through holes 508 of the sliding member 500. The size of the through holes 508, measured along the movement direction of the restricting member 506, is greater than the guiding post 420.

Figure 5:
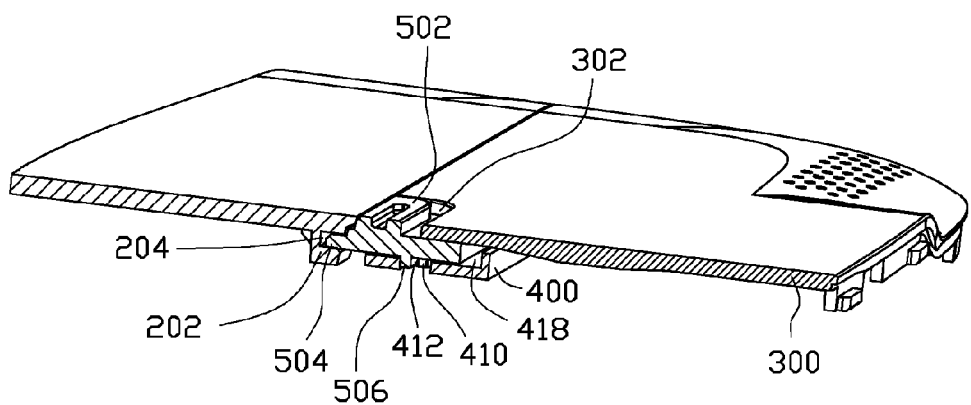
FIG. 5 is a cross-sectional view taken along the line V-V in FIG. 1.

FIGS. 4 and 5 show the toggle 502 in a latching position. The latching portions 504 are received in the corresponding openings 204. The restricting member 506 is received in the hollow portion 412 adjacent to the opening 204. Because of the protrusions 410, the restricting member 506 is retained in the hollow portion 412 adjacent to the opening 204 without external force.

Figure 6:
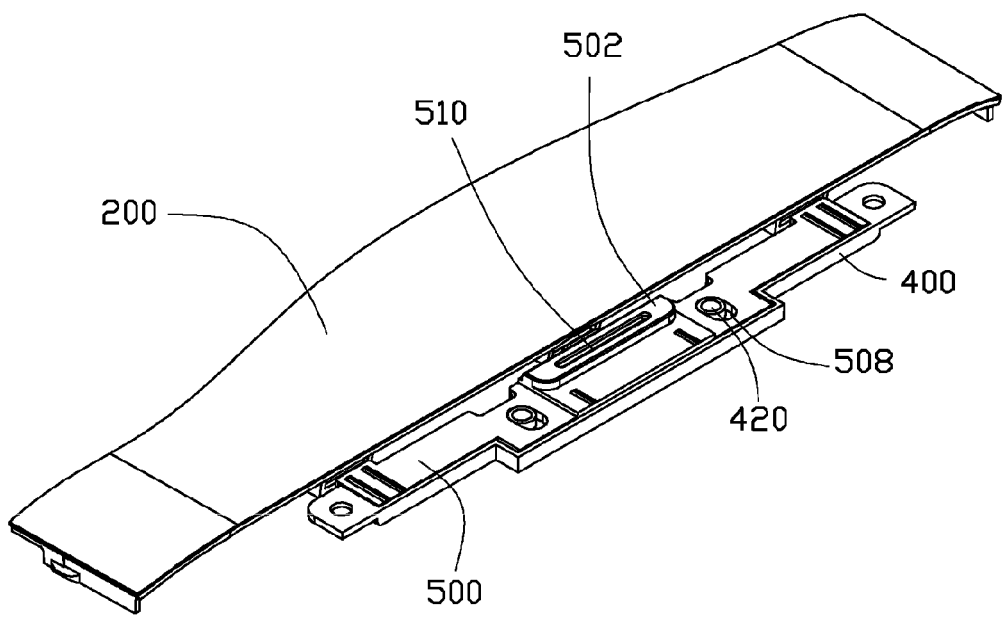
FIG. 6 is similar to FIG. 4, but with a sliding member separated from an upper cover.

Referring to FIGS. 5 to 7, to detach the upper cover 200, the toggle 502 can be slid from the latched position to an unlatched position as shown in FIGS. 6 and 7. During the sliding of the toggle 502, the protrusions 410 are urged to elastically deform, until the restricting member 506 passes the hollow space 414 and enters the other hollow portion 412 away from the opening 204. When the toggle 502 slides to the unlatched position, the latching portions 504 move out of the openings 204. The upper cover 200 is then free from the limitation of the latching portions 504 and can be detached from the body of the electronic device.

The sliding member 500 of the cover 100 is not only able to cover the notch 302, but also able to connect the upper cover 200 to the lower cover 300, thus to fix the upper cover 200 to the body of the electronic device more firmly.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A cover comprising:
   an upper cover;
   a lower cover;
   a fixing member made of elastic plastic and defining a restricting groove, a pair of smooth protrusions protruding from opposite sidewalls of the restricting groove, forming a pair of hollow portions at opposite sides of the protrusions; and a sliding member positioned between the lower cover and the fixing member and comprising a restricting member, the restricting member being able to move between the pair of the hollow portions when the protrusions are elastically deformed;
   wherein the lower cover comprises a plurality of protruding posts, each protruding posts defines a threaded hole facing the sliding member, the fixing member defines a plurality of fixing holes allowing for the penetration of bolts that are screwed into the corresponding threaded holes to fix the fixing member to the lower cover, an edge of the lower cover defines a notch, the sliding member comprises at least one latching portion and a toggle that is slidably received in the notch, the upper cover comprises at least one block and defines at least one opening formed in the at least one block, the at least one latching portion protrudes from an edge of the sliding member facing the opening and is slidably received in the at least one opening correspondingly to connect the upper cover to the lower cover.

2. The cover of claim 1, wherein the fixing member defines a pair of slots adjacent to the restricting groove, the pair of slots are symmetrically positioned at opposite sides of the restricting groove, an extending direction of the slots is parallel to a movement direction of the restricting member.

3. The cover of claim 1, wherein the fixing member defines a receiving space opposite to the lower cover to receive the sliding member.

4. The cover of claim 1, wherein the sliding member defines at least one through hole, the fixing member comprises at least one guiding post opposite to the lower cover, the at least one guiding post is received in the at least one through hole, the size of the through hole, measured along the movement direction of the restricting member, is greater than the guiding post.

* * * * *